Patented Nov. 3, 1970

3,537,172
METHOD OF FRICTION WELDING
Valentin Dmitrievich Voznesensky, 17 Neglinnya St., Apt. 20, and Raisa Ivanovna Zaxon, Pervy Babjegorodsky Pereulok 21, Apt. 33, both of Moscow, U.S.S.R.
Continuation-in-part of application Ser. No. 286,850, June 10, 1963. This application Aug. 21, 1967, Ser. No. 661,902
Int. Cl. B23k 27/00
U.S. Cl. 29—470.3        4 Claims

ABSTRACT OF THE DISCLOSURE

A friction welding of a layer of one metal onto a surface of a thin sheet metal article or workpiece for permitting the production of a predetermined profile on the opposite surface in which the article or workpiece is fixed in a die possessing the predetermined profile and a weld rod of the desired metal is pressed against the surface being welded while having movement imparted thereto relative to its longitudinal axis and at the same time it is imparted translational shifting movement to the article or workpiece fixed in the die relative to the rod. The foregoing assures three simultaneous operations, namely, the welding of a hard layer, the heat treatment of the metal below the welded layer and the formation of the desired profile on the surface opposite that to which the layer is welded.

BACKGROUND OF THE INVENTION

The present application is a continuation-in-part of our co-pending application Ser. No. 286,850 filed June 10, 1963 and entitled "Method of Welding on Metals By Friction," now abandoned.

The invention relates to a method for welding a metal to a metal article or workpiece having a thin cross section and provided with a predetermined profile on the opposite surface. More particularly, the invention relates to treating mower or header segments, producing other components or agricultural equipment, such as disc cutters of beet-root harvesters, colter discs, knives of field-forage choppers or tea harvesters, seeder discs, metal cutting knives and the like.

In the welding art, it is well known that the built-up welding methods using electric arcing or gas flames are not entirely suitable for articles or workpieces of thin cross section due to the large area of thermal influence inherent in such methods and which leads in the majority of instances, to damage of the articles or workpieces. While attempts have been made to adapt the existing methods to built-up welding of thin sheet workpieces, such attempts did not produce favorable results insofar as articles or workpieces having complex profiles on the surface opposite to the welded one were concerned. Also, suggestions have been made for welding metal onto the surface of flat articles and subsequently processing the articles to impart the required profile to the surface opposite to the welded one thereof, but such proposals have not proven to be satisfactory. This has been due to the fact that the process became more complex and in certain situations following the built-up welding of a particularly hard metal layer, it was impossible to shape the article opposite surface due to the high brittleness so to speak, of the welded layer.

While many attempts have been made to overcome the above mentioned and further problems which exist in the art, to the best of our knowledge, none of the prior attempts have proven successful for welding hard metal layers on articles or workpieces of thin cross section and for simultaneous profiling of the surface opposite to the welded one.

SUMMARY OF THE INVENTION

An important object of this invention is to provide a built-up welding method which overcomes the problems presently existing in the art for welding metal layers on articles or workpieces of thin cross section and profiling a surface opposite the surface having the welded layer.

A further object of our invention is to provide a built-up welding method utilizing friction by which a layer is welded on one surface of the article or workpiece, with the metal below the welded layer being heat treated and the opposite surface of the article or workpiece has the desired profile imparted thereto with such operations occurring simultaneously.

A further object of our invention is to provide a built-up welding method utilizing friction by which a layer is welded on one surafce of the article or workpiece while the desired profile is being formed on the opposite surface and simultaneously the volume of metal directly below the welded layer undergoes the thermal treatment of type due to the heat generated in the process of friction of the rod against the article or workpiece as well as to the pressing forces.

Further important objects and advantages of the invention will become more readily apparent to persons skilled in the art from the following detailed description and attached drawings and in which drawings:

DETAILED DESCRIPTION OF THE INVENTION

The welding process is effected at the expense of heat released upon friction on the end face of a weld rod of a cast hard alloy and the surface of the workpiece to which the layer is welded. In order to execute the process, the following conditions must be provided.

(1) The end face of the weld rod must be pressed with a certain force to the surface of the workpiece to which the layer is welded.

(2) The weld rod must be rotated at a definite r.p.m. relative to the workpiece.

(3) A supporting die must be employed for avoiding linear deformation due to heating and the application of mechanical force when thin walled workpiece are involved and (4) To effect the welding along the entire length of the workpiece, the workpiece must execute a linear movement at a certain speed with respect to the rotating rod.

Figure 1:
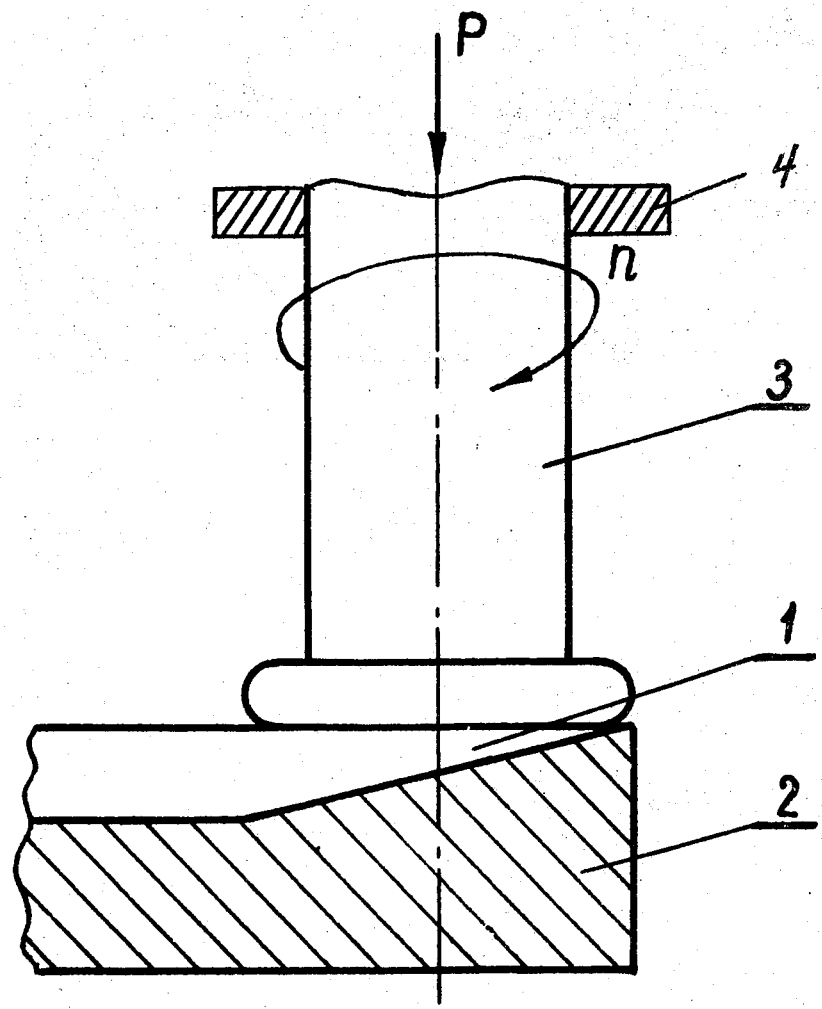
FIG. 1 is a view illustrating diagrammatically the manner in which a metal layer is welded to one surface of an article or workpiece while simultaneously it is formed with the desired profile on the opposite surface.
Figure 3:
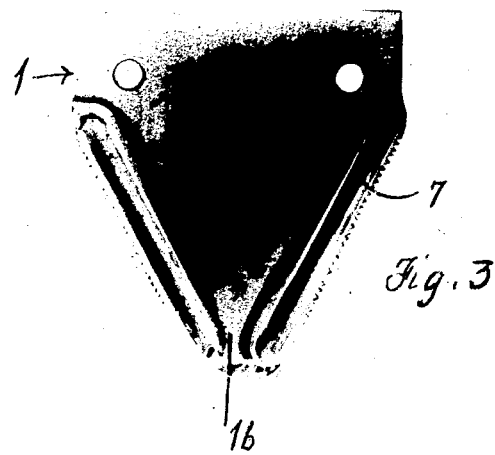
FIG. 3 is a plan view of a mower segment.
Figure 5:
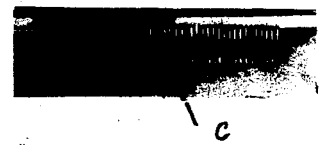
FIG. 5 is a view of an element of a corrugated die employed in the process.

The welding process can be accomplished by a heat treatment of the metal immediately below the layer being welded, since welding by friction involves pressures facilitating heat treatment (stable sustenite conditions of metal under pressure) and which in nature is related to ausforming. Variations in temperature conditions through the depth of the metal in turn results in variable hardness in cross section and this has significant value for the treatment of knives to make the knives self-sharpening. As previously mentioned, in addition to the simultaneous welding and heat treatment, a desired profile, such as corrugations, can be provided with the assistance of a die on the surface opposite the surface having the layer welded thereto. With reference to the drawings, it will be noted that an article or workpiece denoted 1 and which workpiece is a mower or header cutter segment as shown in FIG. 3, is positioned fixedly in a rigid die 2 of a heat resistant alloy. As clearly illustrated in FIGS. 1 and 5, the edges of the segment were sharpened at an angle of 18° to 25° and secured to a die having corrugations C located at the desired positions. A weld metal in the form of a bar, rod, or the like 3 is attached in a suitable clamp 4 to which rotation may be imparted relative the longitudinal line or vibratory movement in a plane of the surface of the article to be welded.

The workpiece or article 1 may be of rolled steel of 2 mm. of the following compositions:

| | Steel 45 | Steel U-9 |
|---|---|---|
| Percent: | | |
| Carbon | 0.42–0.49 | 0.85–0.94 |
| Manganese | 0.5–0.8 | 0.15–0.35 |
| Silicon | 0.17–0.37 | 0.15–0.35 |
| Sulphur | | ≯0.03 |
| Phosphorus | | ≯0.35 |
| Chromium | ≯0.25 | |
| Stable austenite state (degrees) | >800 | >750 |

The weld rod 3 is of a cast alloy having the following composition and referred to as V3K stellite:

| | Percent |
|---|---|
| Carbon | 1–1.5 |
| Silicon | 2.5 |
| Manganese | — |
| Chromium | 28–32 |
| Tungsten | 4–5 |
| Nickel | Up to 2 |
| Iron | Up to 2 |
| Cobalt | The rest |

In order to weld a layer 7 onto surface 1b of the rolled steel 1 after the edges have been sharpened as previously mentioned and the article fixed to the die 2, the rod 3 is pressed against the surface 1b as illustrated by arrow P with a force of the order of 3.5–7 kg./sq. mm. (force normally varies from 1 to 20 kg./sq. mm.) and rotated at a speed about its longitudinal axis of 2,150 r.p.m. for a rod having a six (6) mm. diameter and 1,500 r.p.m. for a rod having a 10-mm. diameter. In other words, the speed is determined by the outer diameter of the rod 3.

Figure 2:
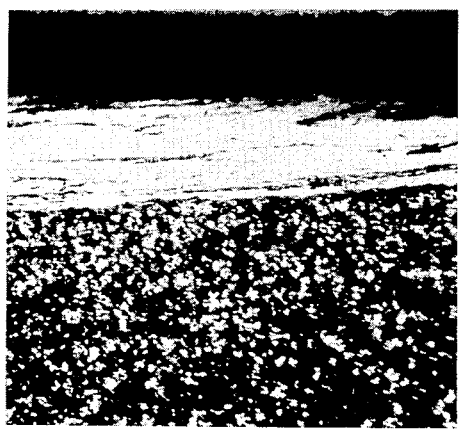
FIG. 2 is a view magnified 200 times illustrating the metal article and welded layer on one surface thereof.

Under the action of these forces, the face end of the weld rod 3 and the metal of the workpiece at the point of contact with the weld rod were heated to 1,000–1,200° C. and thereafter the workpiece 1 and die 2 were set in motion at a speed of 15–20 m./hr. whereby a hard alloy layer 0.05–0.1 mm. in thickness builds up on the surface of the workpiece in contact with the rod as illustrated in FIG. 2. Under other conditions, the thickness of the welded layer can be 0.02–0.15 mm.

Figure 6:
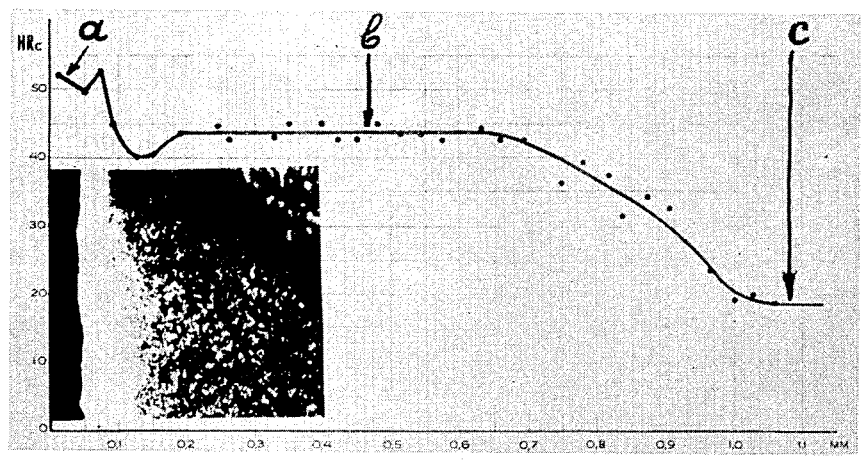
FIG. 6 is a graph illustrating the hardness along the cross section of the segment produced according to the invention.
Figure 4:
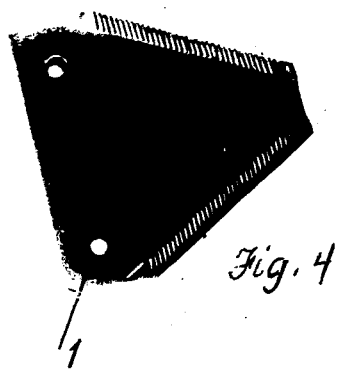
FIG. 4 is a plan view of the opposite surface of the segment shown in FIG. 3.

The face of the workpiece 1 in contact with the die 2 is provided with corrugations as clearly seen in FIG. 4. When steel 45 is involved, the hardness of the metal underlying the welded layer is raised to $Rc=45$ with the initial hardness being $Rc=18-20$ (FIG. 6), with the metal acquiring finally dispersed troostite martensite structure. During the welding cycle, there occurs a setting of the metal being welded with the article or workpiece thereby providing an intimate connection between the layer and the article or workpiece. Hence, it is possible to weld different metals even including hard facing alloys. For example, it is possible to weld steel to steel, hard alloys having cobalt or nickel as well as alloys containing Br etc.

It is further possible to use the invention for welding metal layers for use in electrical engineering, such as welding layers on metal possessing high electric conductivity to steel articles, thus ensuring great strength and having profiled surfaces for increasing the rigidity thereof. The invention additionally tends to reduce the consumption of nonferrous metals thereby simplifying the technological process.

The invention is also efficacious for other industries which have high demands respecting anti-corrosive and decorative properties. Metal layers having anti-corrosive properties can find special use in the chemical industry which requires thin wall articles possessing great strength.

The heat resistant die is of material value in practicing the method, since the die exerts a favorable influence on the structure of the workpiece and the layer welded thereon by virtue of the die limiting considerably the heating effect and preventing the occurrence of linear deformations. Consequently, the article or workpiece is subjected to substantially no warpage as has been the case with articles treated or processed according to the known welding techniques.

What is claimed is:

1. A method of the friction built-up welding of a layer of one metal onto a surface of a thin sheet metal article and providing a predetermined profile to the opposite surface of the article, comprising the steps of positioning and fixing the article on a die of a heat resistant alloy and having a predetermined profile, pressing the end of a metal weld rod against the surface of the article and imparting movement to the rod relative to the article and simultaneously effecting relative shifting between the end of the rod and the surface of the article so as to weld the layer onto the surface, thus providing a built-up layer on said surface and forming the predetermined profile on the opposite surface.

2. The method of friction welding as claimed in claim 1 in which the end of the weld rod is pressed against the surface with a pressure of the order of 1–20 kg./sq. mm.

3. The method of friction welding as claimed in claim 2 in which the movement imparted to the weld rod is effected by rotation of the rod about its axis with a speed of 2,000–5,000 r.p.m.

4. The method of friction welding as claimed in claim 2 in which said movement of the weld rod is effected through vibration.

References Cited

UNITED STATES PATENTS

| 2,914,425 | 11/1959 | McGuire | 29—470.3 |
| 3,025,184 | 3/1962 | Blair et al. | 118—76 |
| 3,126,625 | 3/1964 | Laing | 29—470.3 |

FOREIGN PATENTS 572,789   1945   Great Britain.

JOHN F. CAMPBELL, Primary Examiner

B. L. ADAMS, Assistant Examiner

U.S. Cl. X.R.

29—475